United States Patent [19]

Funaki et al.

[11] Patent Number: 5,708,887
[45] Date of Patent: Jan. 13, 1998

[54] FILM FEEDING CONTROL DEVICE AND METHOD FOR CAMERA

[75] Inventors: Akihiko Funaki; Naoyuki Nishinou, both of Saitama, Japan

[73] Assignees: Fuji Photo Film Co., Ltd., Kanagawa; Fuji Photo Optical Co., Ltd., Saitama-ken, both of Japan

[21] Appl. No.: 727,216

[22] Filed: Oct. 8, 1996

[30] Foreign Application Priority Data

Oct. 9, 1995 [JP] Japan .......................... 7-261780

[51] Int. Cl.$^6$ .......................... G03B 1/18; G03B 17/24
[52] U.S. Cl. .......................... 396/389; 396/397; 396/406; 396/319
[58] Field of Search .......................... 396/387, 389, 396/392, 395, 397, 406, 310, 319

[56] References Cited

U.S. PATENT DOCUMENTS 5,345,286  9/1994  Stiehler .......................... 396/397
5,576,785  11/1996  Kazami et al. .......................... 396/397

*Primary Examiner*—Safet Metjahic
*Assistant Examiner*—J. K. Han
*Attorney, Agent, or Firm*—Sughrue, Mion, Zinn, Macpeak & Seas, PLLC

[57] ABSTRACT

A camera has a feeding motor by use of which photo film is fed. 24 groups of perforations are arranged along one edge of the photo film, and regularly at a distance L2 one group from another. Each of the perforation groups is associated with one frame, and includes two perforations arranged at a distance L1 therebetween. To control the photo film feeding, pulses are generated in synchronism with the photo film feeding. The perforations are detected through a sensor. The pulses are counted while the photo film is fed by the distance L1 or L2, and during a period started upon movement of a first one of the perforations past the sensor and finished upon detection of a second one of the perforations at the sensor. A counted number of the pulses is compared with a reference value upon finish of counting the pulses. If the counted number is equal to or more than the reference value, the feeding motor is decelerated. Afterwards, the feeding motor is stopped upon detection of a third one of the perforations at the sensor. If the counted number is less than the reference value, the feeding motor is still driven.

12 Claims, 9 Drawing Sheets

F I G. 2
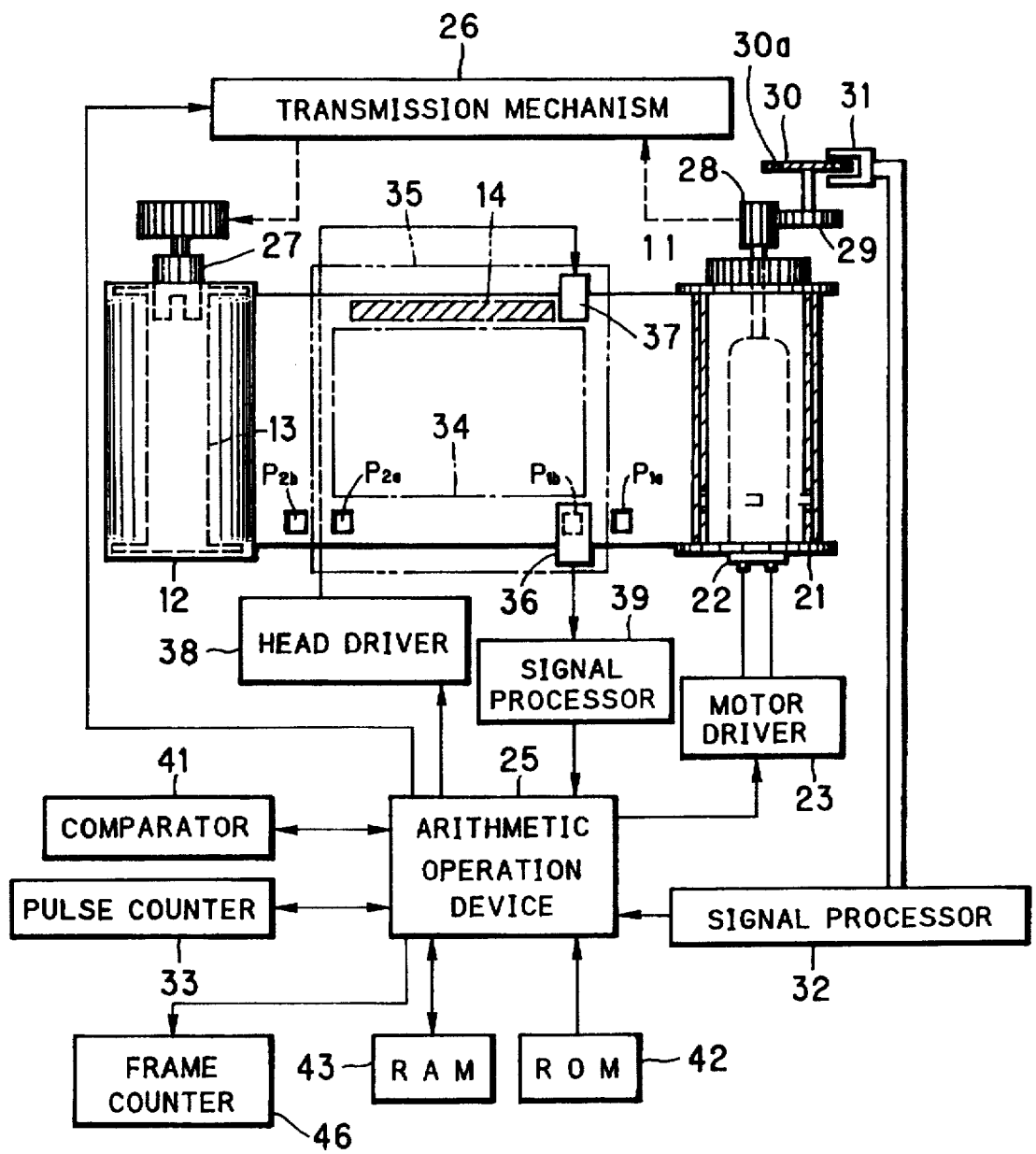

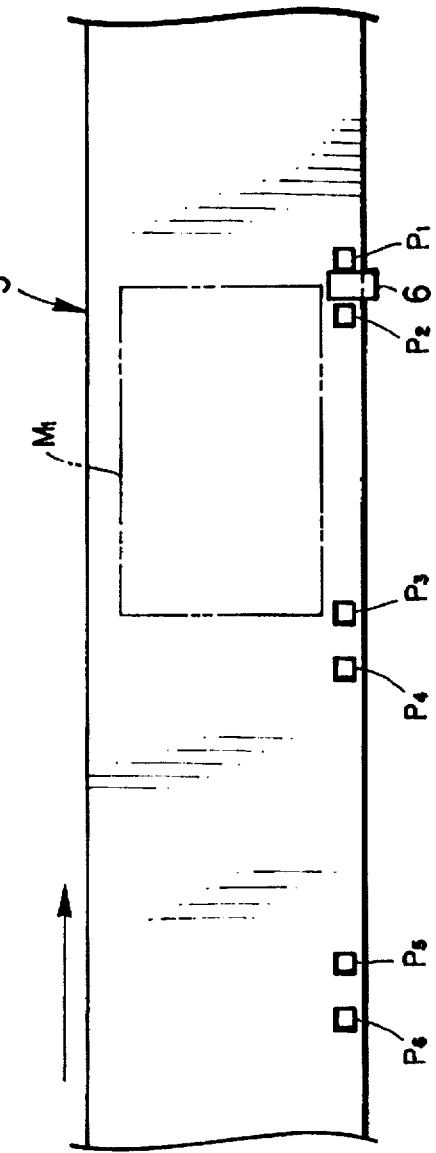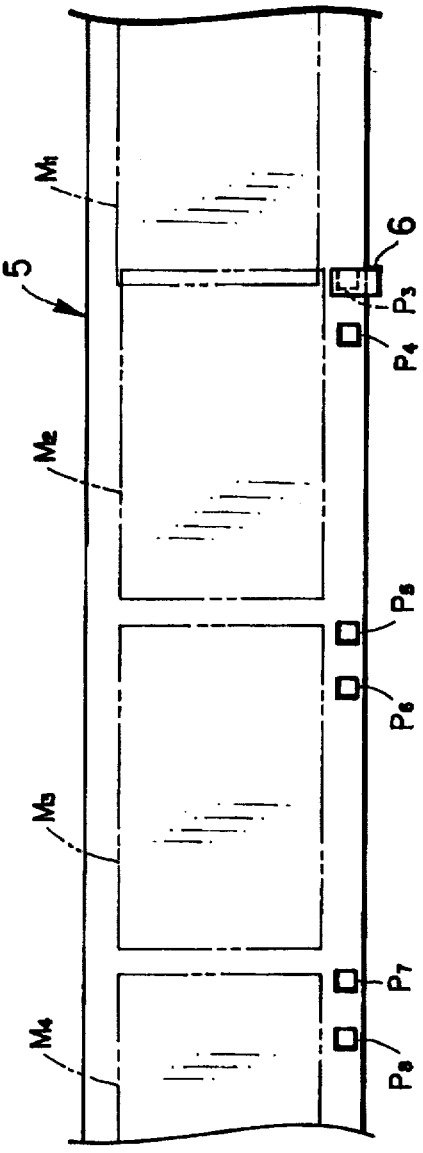

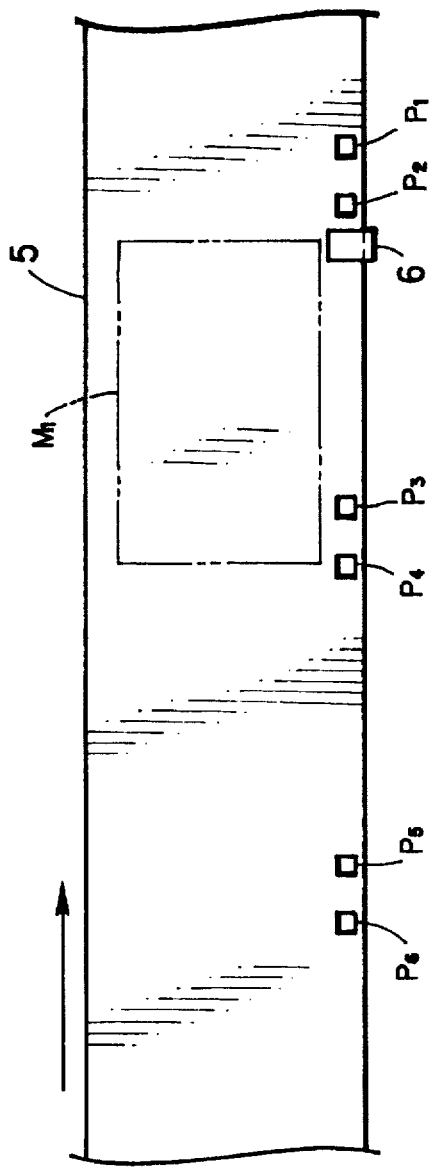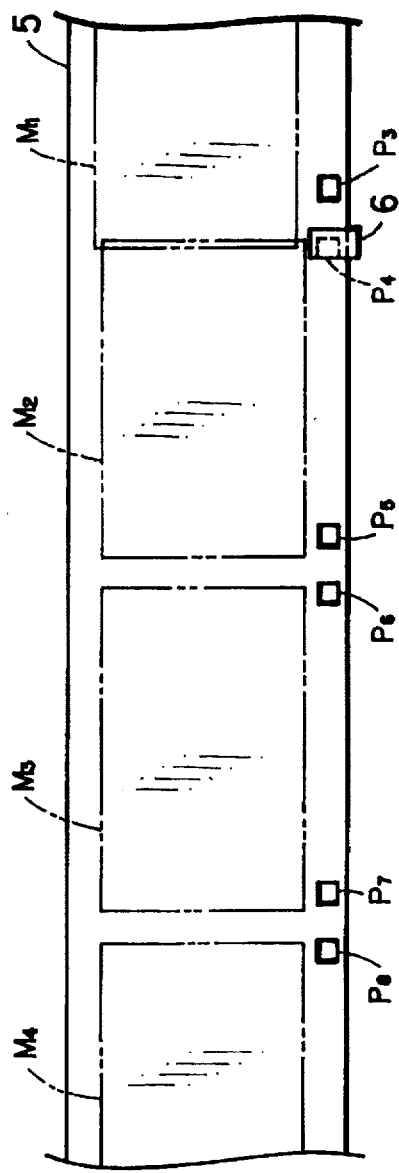

FILM FEEDING CONTROL DEVICE AND METHOD FOR CAMERA

BACKGROUND OF THE INVENTION

1. Field of the Invention

The present invention relates to a film feeding control device and method for a camera. More particularly, the present invention relates to a film feeding control device and method for a camera in which photo film having two perforations per one frame is used.

2. Description Related to the Prior Art

A photo film feeding control device according to known techniques of the camera has a driven sprocket wheel, which is rotated by movement of photo film. When one exposure is taken to create a frame, a feeding motor is driven to start feeding the photo film. As soon as the sprocket wheel is caused to make one rotation, a shutter is charged. The sprocket wheel is locked and the feeding motor is stopped. Now another frame of the photo film is set on an exposure aperture.

There has been a recent proposal of photo film feeding control device for feeding the photo film by one frame without the sprocket wheel. The photo film, for example, has perforations of which respective two are associated with one frame. A perforation sensor is disposed in a feeding path for the photo film to detect the perforations for the purpose of the feeding control. To stop the photo film reliably in each of expected positions, the feeding motor is decelerated upon detection of a first one of the perforations at the sensor. The feeding motor is abruptly stopped upon detection of an beginning edge of a second one of the perforations.

In the photo film feeding control device having the sensor, however, the photo film is not fixedly retained, as it does not have the sprocket wheel. When shock or vibration occurs to the camera, the photo film is likely to be deviated from a proper stop position as expected.

Referring to FIG. 8A, photo film 5 is fed from the left to the right. In a proper condition, the photo film 5 should be stopped when a perforation $P_2$ is confronted with a perforation sensor 6. If unwanted shock or vibration occurs, the photo film 5 is stopped so that the sensor 6 is located on a photo film portion between a perforation $P_1$ and the perforation $P_2$. On the photo film 5 in this condition, an exposure is taken. The one-frame feeding is started, to cause the sensor 6 to detect the perforation $P_2$ at first. The feeding of the photo film 5 is decelerated. When the sensor 6 detects a perforation $P_3$, the camera erroneously recognizes the perforation $P_3$ as a second one, and stops the feeding of the photo film 5 as illustrated in FIG. 8B. The photo film 5 has been fed by a distance which is shorter than a regular length by an amount of an interval between the perforation $P_3$ and a perforation $P_4$. There occurs deviation in the frame position at successive frames $M_2$, $M_3$, and so on. Of course a second exposure being taken results in lack of a space between a frame $M_1$ and the frame $M_2$. The frames $M_1$ and $M_2$ are contacted or overlapped on one another.

When the sensor 6 is located on a photo film portion between the perforations $P_2$ and $P_3$ as illustrated in FIG. 9A, the sensor 6 detects the perforation $P_3$, to decelerate the feeding of the photo film 5. When the sensor 6 detects the perforation $P_4$, the camera stops the feeding of the photo film 5 as illustrated in FIG. 9B. The photo film 5 is stopped in the proper position. The frame $M_2$ is also stopped properly without deviation. The photo film 5 has been fed by a distance which is shorter than the regular length by an amount of an interval between the perforation $P_2$ and the frame $M_1$. Again the frames $M_1$ and $M_2$ are contacted or overlapped on one another.

SUMMARY OF THE INVENTION

In view of the foregoing problems, an object of the present invention is to provide a photo film feeding control device for a camera in which double exposure between frames and deviation of the frame position can be avoided even when the photo film is deviated by shock or vibration.

In order to achieve the above and other objects and advantages of this invention, a photo film feeding control device for a camera includes a pulse generator for generating a pulse in synchronism with feeding of the photo film. A sensor is disposed to confront with the photo film, for detecting the perforations in the photo film being fed. A pulse counter counts the pulse from the pulse generator while the photo film is fed by the first or second distance, the pulse counter starting counting the pulse upon movement of a first one of the perforations past the sensor, and finishing counting the pulse upon detection of a second one of the perforations at the sensor. A comparator compares a counted number of the pulse counted by the pulse counter with a first reference value upon finish of counting the pulse, the comparator generating a first comparison signal if the counted number is equal to or more than the first reference value. A controller drives the feeding motor after an exposure is taken and effects a stopping control of the feeding motor being driven, wherein the stopping control decelerates the feeding motor if the first comparison signal occurs while the photo film is fed, and stops the feeding motor upon detection of a third one of the perforations at the sensor, and wherein if the pulse counter finishes counting the pulse without occurrence of the first comparison signal while the photo film is fed, the controller still drives the feeding motor without effecting the stopping control.

In a preferred embodiment, the first reference value is determined as a number of pulses generated by the pulse generator while the photo film is fed by the first distance.

A frame counter counts a number of times of feeding the photo film by the frame. The comparator compares the counted number with a second reference value smaller than the first reference value, the comparator generating a second comparison signal if the counted number is equal to or more than the second reference value. The controller detects feeding of the photo film by the frame if the second comparison signal occurs while the photo film is fed, and steps the frame counter.

The second reference value is determined as slightly greater than a number of pulses generated by the pulse generator while the photo film is fed by the second distance.

BRIEF DESCRIPTION OF THE DRAWINGS

The above objects and advantages of the present invention will become more apparent from the following detailed description when read in connection with the accompanying drawings, in which:

FIG. 2 is a block diagram illustrating a camera including a photo film feeding mechanism and relevant circuits;

FIGS. 8A and 8B are explanatory views in plans, illustrating a state of the photo film according to the prior art, where the photo film is deviated;

FIGS. 9A and 9B are explanatory views in plans, illustrating another unwanted state of the photo film according to the prior art.

DETAILED DESCRIPTION OF THE PREFERRED EMBODIMENT(S) OF THE PRESENT INVENTION

Figure 1:
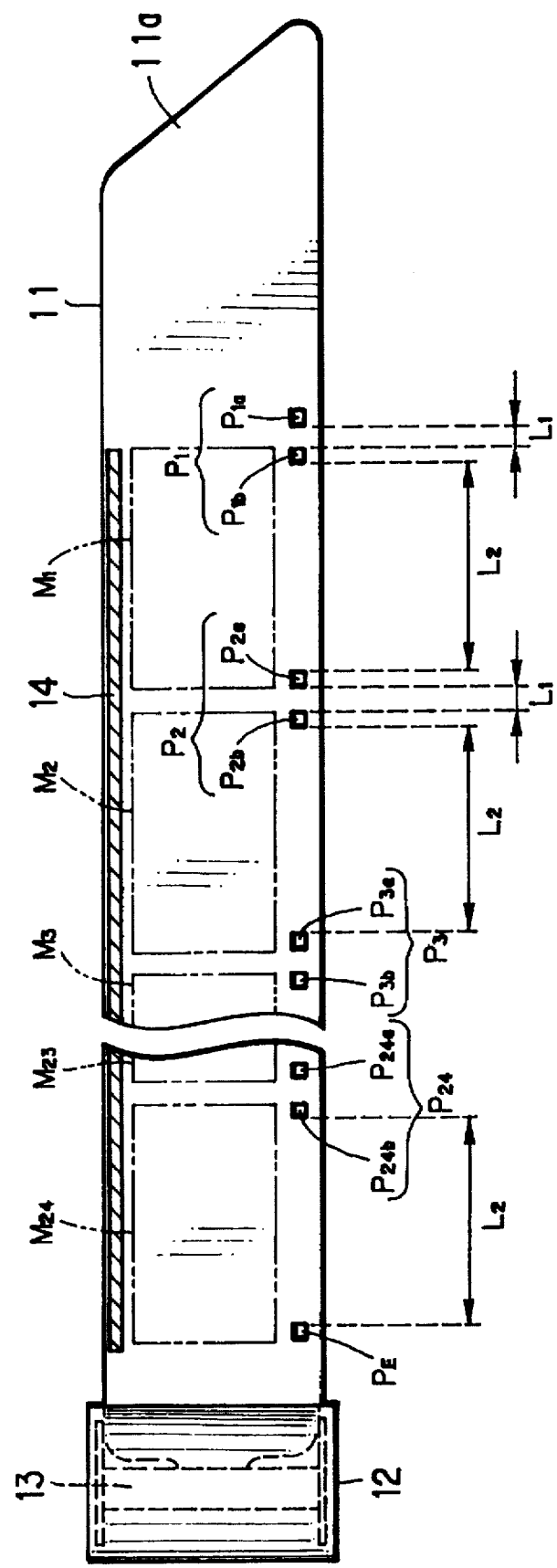
FIG. 1 is a plan illustrating photo film.

In FIG. 1, a photo film 11 has a trailer which is retained on a rotatable spool 13 contained in a cassette shell 12. Perforation groups $P_1$, $P_2$, $P_3$ and so on are formed in the photo film 11 and arranged along its one edge. If the photo film 11 has a length for of 24 exposures, the perforation groups $P_1$–$P_{24}$ are arranged. A magnetic recording region 14 is disposed along another edge of the photo film 11. The magnetic recording region 14 is formed by applying a coating of magnetic recording layer to the whole of the photo film 11. Each of the perforation groups $P_1$–$P_{24}$ includes a perforation $P_{na}$ (perforations $P_{1a}$, $P_{2a}$, $P_{3a}$, ..., $P_{24a}$) for photo film deceleration and a perforation $P_{nb}$ (perforations $P_{1b}$, $P_{2b}$, $P_{3b}$, ..., $P_{24b}$) for photo film stop. Beginnings of frame positions $M_1$, $M_2$, $M_3$, ..., $M_{24}$ are respectively associated with the perforations $P_{1b}$, $P_{2b}$, $P_{3b}$, ..., $P_{24b}$.

L1 is defined as a distance by which each of the perforations $P_{1a}$, $P_{2a}$, $P_{3a}$, ..., $P_{24a}$ is away from an associated one of the perforations $P_{1b}$, $P_{2b}$, $P_{3b}$, ..., $P_{24b}$. L2 is defined as a distance by which the perforation groups $P_1$–$P_{24}$ are arranged one group away from another. The distances L1 and L2 are determined in association with ranges of the frame positions $M_1$, $M_2$, $M_3$, ..., $M_{24}$. To be precise, L1=3.8 mm and L2=23.9 mm.

A perforation PE is formed in a position L2 distant from the perforation group $P_{24}$. The perforation PE is alone and not paired, and is used for detection of the final frame position $M_{24}$.

In FIG. 2 illustrating a camera, in which the inside of a take-up spool 21 contains a feeding motor 22. The feeding motor 22 is connected to a controller or control arithmetic operation device 25 via a motor driver 23, and controlled thereby for the speed and direction of rotation. The rotation of the feeding motor 22 is transmitted by a transmission mechanism 26 to a spool drive shaft 27 engaged with the spool 13. The transmission mechanism 26 is controlled by a signal from the arithmetic operation device 25, and effects operation of changing over linkage of the feeding motor 22 to the take-up spool 21 and the spool drive shaft 27. To wind the photo film 11 about the take-up spool 21, the feeding motor 22 is driven forwards. To rewind the photo film 11 into the cassette shell 12, the feeding motor 22 is driven backwards.

A pinion 28 is secured to a shaft of the feeding motor 22, and meshed with a gear 29. An encoder disk 30 is secured to the gear 29, and is rotated when the feeding motor 22 is rotated. The encoder disk 30 has a great number of minute openings or slits 30a formed radially at a regular pitch. A photo sensor 31 is disposed close to the encoder disk 30. The photo sensor 31 is constituted by a light-emitting diode (LED) and a photo transistor, which are confronted with one another and between which the encoder disk 30 lies. When the encoder disk 30 is rotated to pass the slits 30a between the LED and the photo transistor, the photo sensor 31 generates a pulsed signal. The signal from the photo sensor 31 is processed by a signal processor 32 for the waveform shaping, so that the signal processor 32 generates encoded pulses, which are entered into the arithmetic operation device 25. The encoder disk 30 is rotated during rotation of the feeding motor 22. Each encoded pulse is generated when the feeding motor 22 is rotated by a predetermined angle. A pulse counter 33 is controlled by a control signal from the arithmetic operation device 25, and counts the number of the encoded pulses as generated. The counted number of the pulse counter 33 is used for photo film feeding control, which is described later in detail.

An exposure aperture 34 is disposed to define a range of the photo film 11 to be exposed. A pressure plate 35, known in the art of the camera, is disposed behind the exposure aperture 34. There are a perforation sensor 36 and a magnetic recording head 37 disposed between the pressure plate 35 and a rear cover of the camera. The sensor 36 is a photo sensor for example, and is operable through an opening formed in the pressure plate 35, and detects the perforations $P_{1a}$, $P_{1b}$, $P_{2a}$, $P_{2b}$, $P_{3a}$, ..., $P_{24b}$ in the photo film 11. The recording head 37 operates to write information magnetically to the magnetic recording region 14, the information including trimming information, for example panoramic trimming information, and photograph-taking information, for example photographic subject brightness information. The recording head 37 is driven by the arithmetic operation device 25 via a head driver 38.

Figure 3:
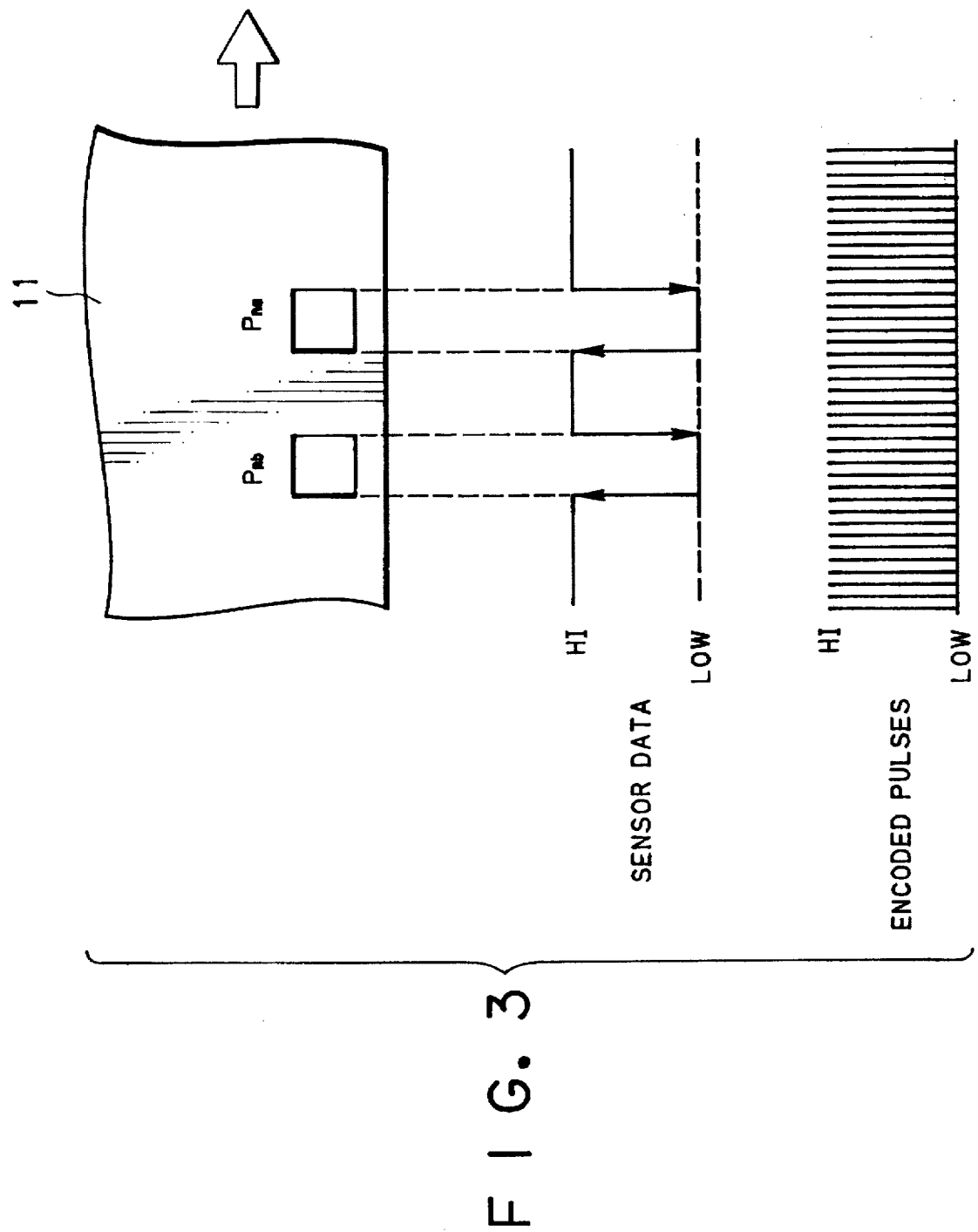
FIG. 3 is an explanatory view illustrating a relationship between perforations, sensor data and encoded pulses.

An output of the sensor 36 is processed by a signal processor 39 for the waveform shaping, so that the signal processor 39 generates sensor data. The sensor data is entered into the arithmetic operation device 25. In FIG. 3, the sensor data has a "Low" level when the perforation $P_{na}$ or $P_{nb}$ (n is an integer) is located at the sensor 36, and has a "High" level when a surface of the photo film 11 is located at the sensor 36. Note that FIG. 3 also illustrates the waveform of the encoded pulses generated from the signal processor 32.

In FIG. 2, a comparator 41, a ROM 42 and a RAM 43 are connected to the arithmetic operation device 25. The comparator 41 compares a counted number X of the pulse counter 33 with reference values SL and SH (SL<SH). If X≧SL or SH, an output of the comparator 41 is "High". If X<SL or SH, the output of the comparator 41 is "Low". The ROM 42 stores programs for effecting sequences of the photo film feeding control and the like. The RAM 43 temporarily stores the reference values SL and SH and other various kinds of data used in executing the sequences. The reference value SL is determined according to the distance L1 between the perforations $P_{na}$ and $P_{nb}$ and an interval at which the encoded pulses are generated. The reference value SH is determined according to the distance L2 and the interval of the encoded pulses. SL is slightly greater than the number of encoded pulses generated while the photo film 11 is fed by the distance L1. SH is slightly smaller than the number of encoded pulses generated while the photo film 11 is fed by the distance L2. Let Y be the number of encoded pulses generated while the photo film 11 moves by the distance L2. It is preferable for example that SH=Y−10, and SL=Y/4 in consideration of a ratio of L1 to L2 (3.8 mm to 23.9 mm). Note that the number Y is changed according to the feeding of the photo film 11. Y is redetermined each time of operation of the one-frame feeding, for use in determining SL and SH for the comparison.

Figure 4:
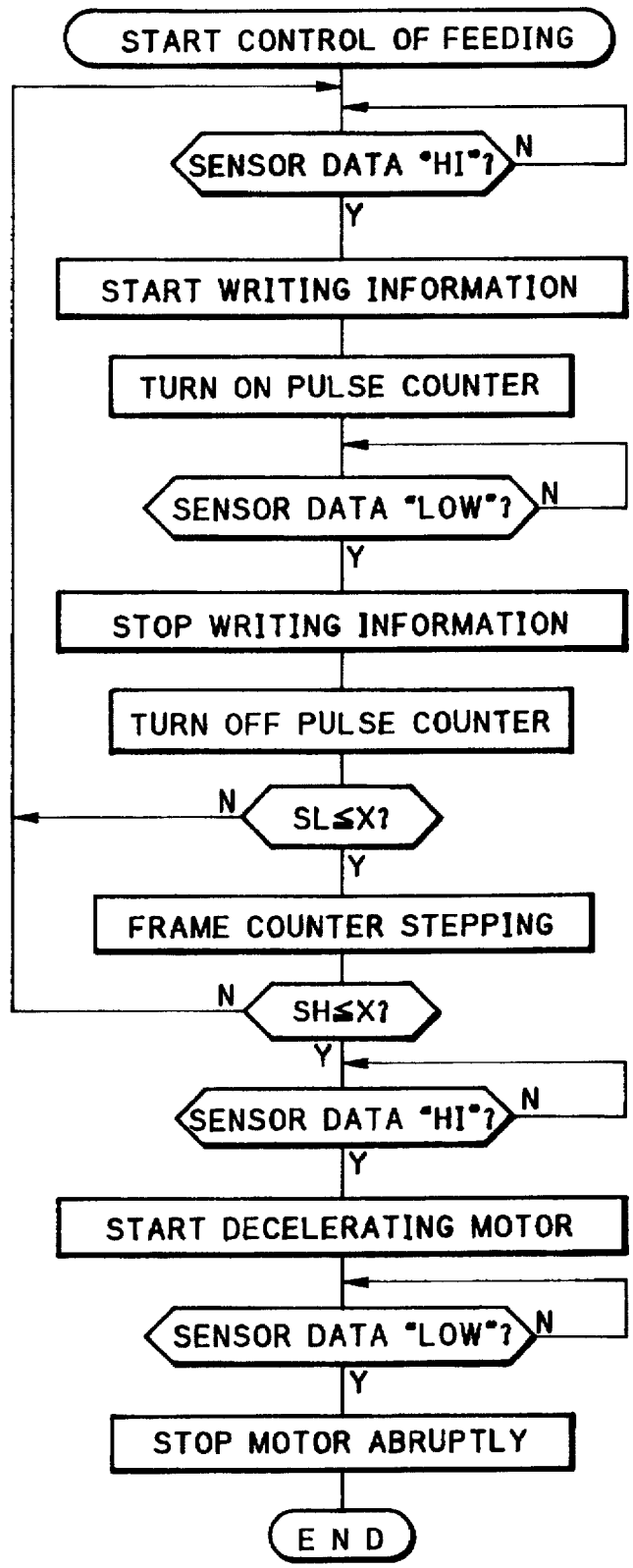
FIG. 4 is a flow chart illustrating a sequence of one-frame feeding of the photo film.

Operation of the photo film feeding control in the above-constructed camera is effected according to the flow of FIG. 4. When an exposure is taken at the frame position $M_n$, a sequence program for the one-frame feeding is read from the ROM 42 and executed. At first the arithmetic operation device 25 causes the motor driver 23 to drive the feeding motor 22 for forward rotation. The take-up spool 21 rotates in the winding direction. The spool drive shaft 27 rotates in the unwinding direction. The photo film 11 is advanced from the cassette shell 12 by the rotation of the spool drive shaft 27. Also the encoder disk 30 rotates during the rotation of the feeding motor 22. The slits 30a in the encoder disk 30 are passed between the LED and the photo transistor in the photo sensor 31, to enter encoded pulses into the arithmetic operation device 25. Each of the encoded pulses is generated when the photo film 11 is moved by a unit distance as the feeding motor 22 rotates by a unit angle correspondingly.

When the photo film 11 starts being fed, the arithmetic operation device 25 checks the sensor data generated from the signal processor 39. If the sensor data is "Low" with a perforation $P_i$ (i is an integer) positioned at the sensor 36, the arithmetic operation device 25 continues operation of feeding the photo film 11. When an ending edge of the perforation $P_i$ comes to the sensor 36, the sensor data changes from the "Low" to the "High". Immediately the arithmetic operation device 25 actuates the pulse counter 33 to count encoded pulses from the signal processor 32. At the same time the arithmetic operation device 25 causes the head driver 38 to drive the recording head 37, to start the magnetic recording to the magnetic recording region 14. If the sensor data is "High" upon the start of feeding the photo film 11, immediately the arithmetic operation device 25 actuates the pulse counter 33 to count encoded pulses from the signal processor 32.

In the movement of the photo film 11, a beginning edge of a perforation $P_{i+1}$ comes in front of the sensor 36. In response, the sensor data from the signal processor 39, having been "High", goes "Low". The arithmetic operation device 25 stops driving the recording head 37, to terminate writing operation to the magnetic recording region 14. Also the arithmetic operation device 25 stops the pulse counter 33 from counting the encoded pulses. Consequently the number of the encoded pulses is obtained as generated during the movement of the photo film portion between the perforations $P_i$ and $P_{i+1}$ past the sensor 36.

Figure 5A:
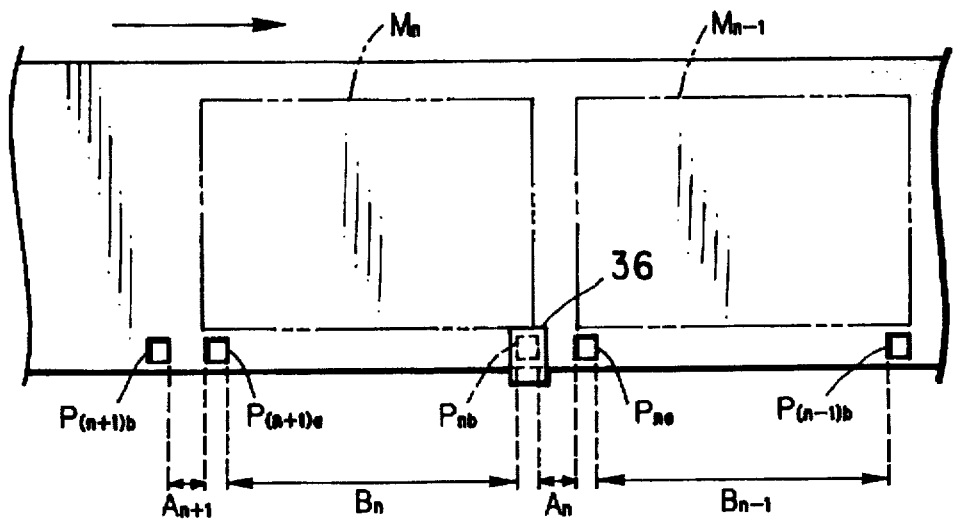
FIGS. 5A and 5B are explanatory views in plans, illustrating a state of the photo film properly positioned.
Figure 5B:
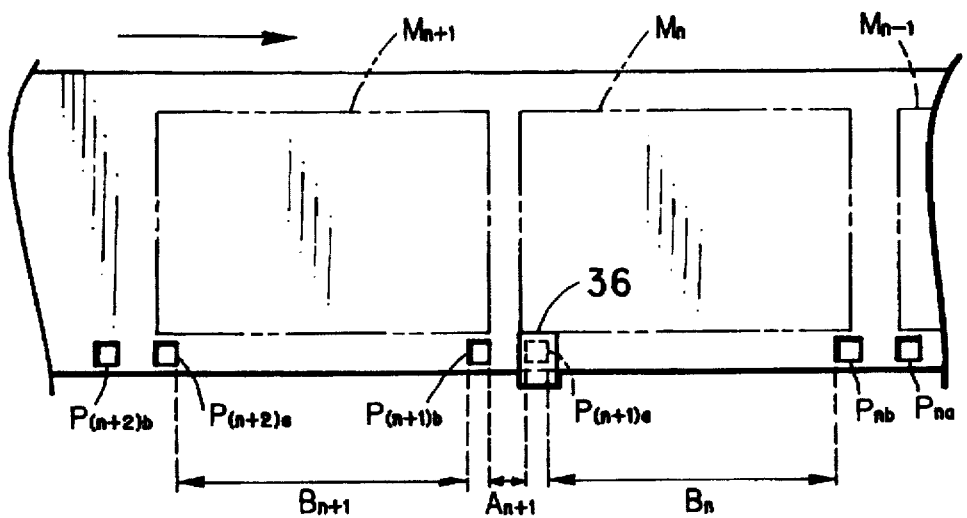

Then the arithmetic operation device 25 actuates the comparator 41, which compares the counted number X from the pulse counter 33 with the reference values SL and SH successively. If SH≦X, then it is detected that the photo film 11 has been fed by the distance L2. FIG. 5A illustrates a state at the time of starting rotation of the feeding motor 22. In front of the sensor 36 is located the perforation $P_{nb}$, corresponding to the frame position $M_n$. It is found that an exposure has been taken on the frame position $M_n$ properly without deviation. The arithmetic operation device 25 responsively starts the stop control of the feeding. Note that FIG. 5B illustrates a state later than that of FIG. 5A, in which the perforation $P_{(n+1)a}$ is located at the sensor 36.

Figure 6A:
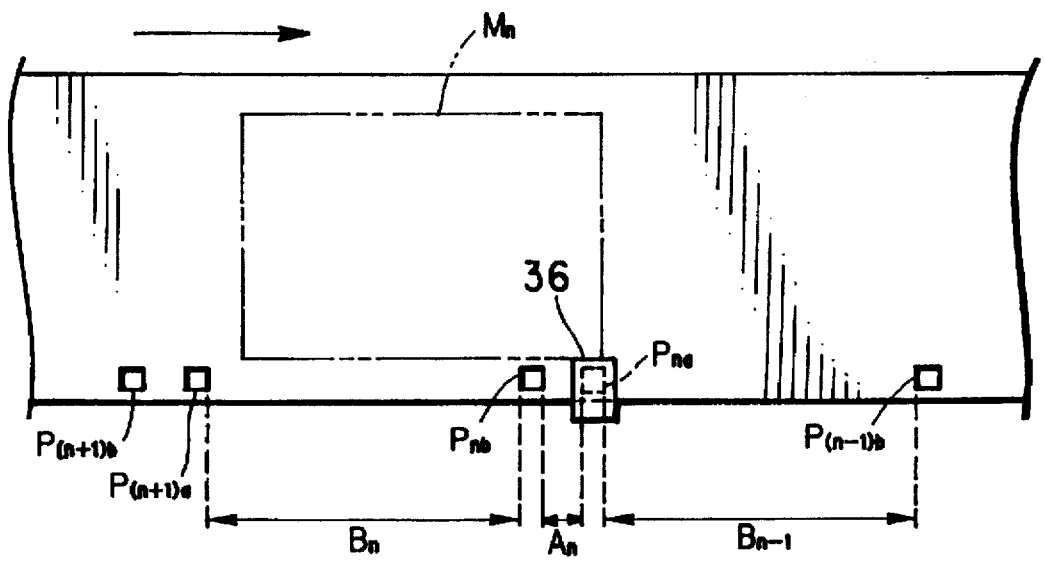
FIGS. 6A and 6B are explanatory views in plans, illustrating a state of the photo film deviated in the feeding direction.
Figure 6B:
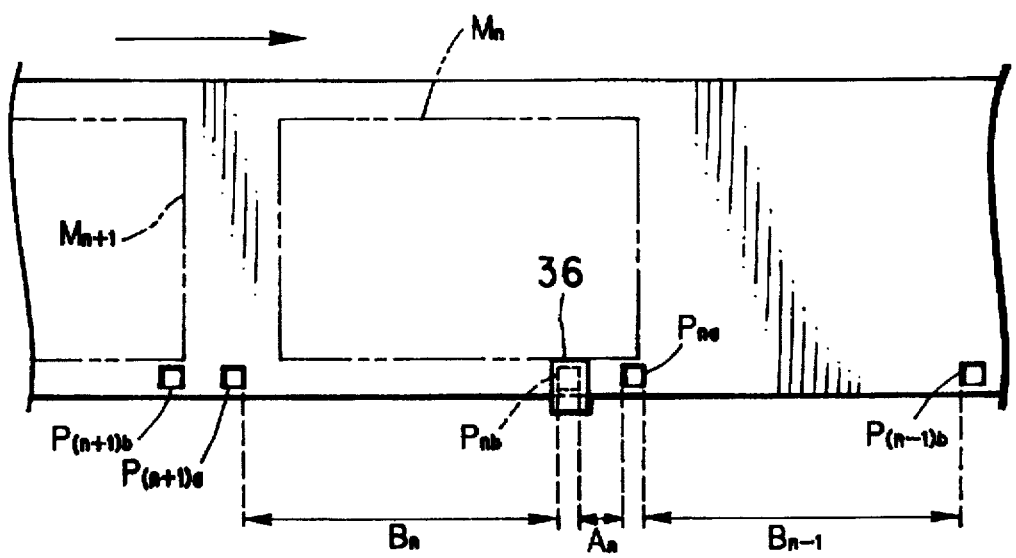

If X<SL, then the photo film 11 has been fed only at a distance shorter than the distance L1. FIG. 6A illustrates a state at the time of starting rotation of the feeding motor 22. In front of the sensor 36 is located a photo film portion $A_n$ between the perforations $P_{na}$ and $P_{nb}$, or is located at the perforation $P_{na}$. It is possible that a point slightly deviated from the perforation $P_{na}$ toward the perforation $P_{(n-1)b}$ (L1 or less distant from the perforation $P_{na}$) may be located in front of the sensor 36. Accordingly the arithmetic operation device 25 detects according to X<SL that the frame position $M_n$ has a range deviated toward the frame position $M_{n-1}$. The deviated range of the frame position $M_n$ lies on at least both the photo film portions $A_n$ and $B_n$, not simply on the photo film portion $B_n$. Note that FIG. 6B illustrates a state later than that of FIG. 6A, and in which the perforation $P_{nb}$ is located at the sensor 36.

Figure 7A:
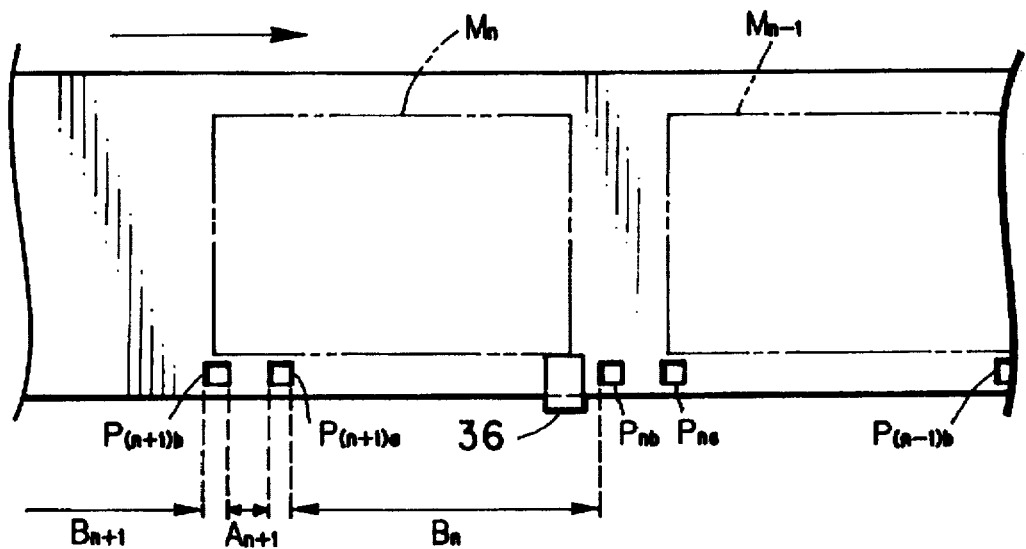
FIGS. 7A and 7B are explanatory views in plans, illustrating a state of the photo film deviated in reverse to the feeding direction.

If SL≦X<SH, then the photo film 11 has been fed at a distance greater than the distance L1 but shorter than the distance L2. FIG. 7A illustrates a state at the time of starting rotation of the feeding motor 22. In front of the sensor 36 is located a photo film portion $B_n$, or is located the photo film portion $B_{n-1}$ which is prior to the perforation $P_{na}$ (L1 or more distant from the perforation $P_{na}$). Accordingly the arithmetic operation device 25 detects that the frame position $M_n$ has a deviated range lying on at least both the photo film portions $B_n$ and $A_{n+1}$, or on at least both the photo film portions $A_n$ and $B_{n-1}$.

Figure 7B:
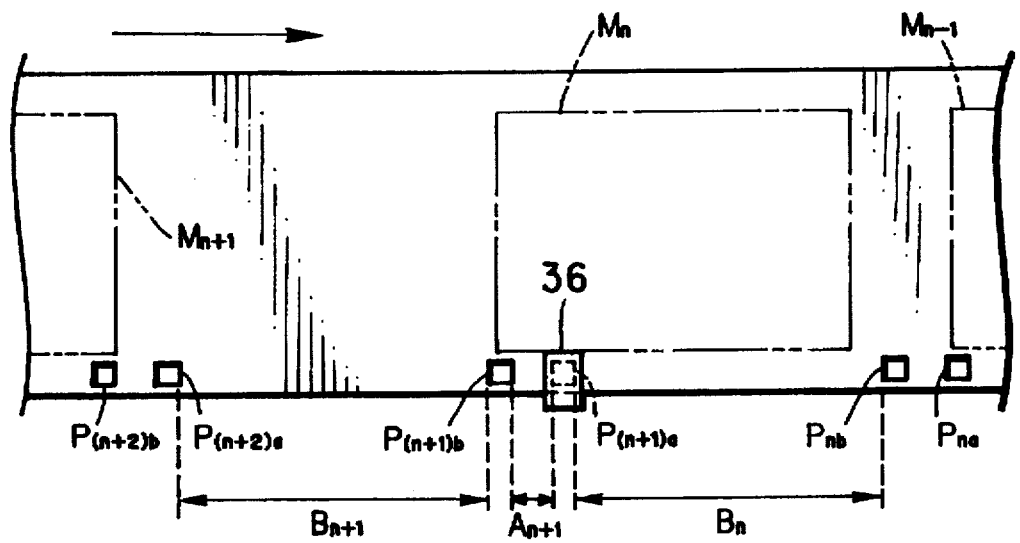

When the arithmetic operation device 25 detects occurrence of deviation of the frame position $M_n$, the arithmetic operation device 25 resets the pulse counter 33 to determine zero (0) for the counted number X. In a similar manner to the above, the photo film 11 is further fed while monitoring the position of the photo film 11 according to the counted number X of the pulse counter 33. When the counted number X as the number of the encoded pulses becomes the reference value SH or more to move the photo film 11 by the distance L2 or more, the arithmetic operation device 25 starts the stop control. In other words, the photo film 11 has been moved by a length as a sum of the distance L2 and two times the width of each perforation. As soon as the perforation $P_{na}$ passes the sensor 36, the stop control is started. In the example of FIGS. 6A and 6B, the stop control starts when the perforation $P_{(n+1)a}$ passes the sensor 36. In the example of FIGS. 7A and 7B, the stop control starts when the perforation $P_{(n+2)a}$ passes the sensor 36.

In short, if the photo film 11 upon taking the exposure in the frame position $M_n$ has the state of FIG. 6A, then perforations are moved past the sensor 36 in the order of $P_{na}$, $P_{nb}$ and $P_{(n+1)a}$, before the perforation $P_{(n+1)b}$ is stopped at the sensor 36.

If the photo film 11 upon taking the exposure in the frame position $M_n$ has the state of FIG. 7A, then perforations are moved past the sensor 36 in the order of $P_{(n+1)a}$, $P_{(n+1)b}$ and $P_{(n+2)a}$, before the perforation $P_{(n+2)b}$ is stopped at the sensor 36.

Note that a frame counter 46 is stepped by one each time that the comparison between the counted number X and the reference value SL results in SL≦X. The photo film 11 is detected to have moved over the distance L1, so that one of the photo film portions $B_n$, $B_{n+1}$ and so on has moved past the sensor 36. The frame counter 46 is stepped unfailingly in association with the respective frame positions $M_n$, $M_{n+1}$ and so on, by checking the photo film portions $B_n$, $B_{n+1}$ and so on at the sensor 36.

When an ending edge of the perforation $P_{(n+1)a}$ or $P_{(n+2)a}$ comes in front of the sensor 36, the sensor data changes from the "Low" to the "High". In response, the arithmetic operation device 25 decelerates the feeding motor 22. When a beginning edge of the perforation $P_{(n+1)b}$ or $P_{(n+2)b}$ comes in front of the sensor 36, the sensor data changes from the "High" to the "Low". In response, the arithmetic operation device 25 abruptly stops the feeding motor 22. Now an unexposed portion of the photo film 11 in the frame position $M_{n+1}$ is set on the exposure aperture 34. An ending edge of the frame position $M_n$ has already moved past the sensor 36 due to feeding of the photo film 11 over one frame. There does not occur an overlap of the ending edge of the frame position $M_n$ on a beginning edge of the frame position $M_{n+1}$. After the frame position $M_{n+1}$ is exposed, the same sequence is repeated, to set frames on the exposure aperture 34 one after another. Note that, in the example of FIGS. 7A and 7B, the frame position $M_{n+1}$ is defined one frame subsequent to an originally expected position. But the frame counter 46 is stepped each time when one of the photo film portions $B_n$, $B_{n+1}$ and so on is moved past the sensor 36. The user can be informed of the remaining number of exposable frames.

Note that, in positioning the first frame position $M_1$, the camera effects specific operation associated with the initial advancement of the photo film 11. The sensor 36 detects the perforation $P_{1a}$ arranged initially in the vicinity of a leader 11a. Immediately the arithmetic operation device 25 enters operation of decelerating the feeding of the photo film 11. The sensor 36 detects the perforation $P_{1b}$ next. Responsively the arithmetic operation device 25 effects the stop control of the photo film 11, so that the first frame position $M_1$ can be set with precision.

Note that the above embodiment is directed to the camera in which an exposure is taken on the photo film 11 each time the photo film 11 is drawn out of the cassette shell 12 frame after frame. The present invention is applicable to a prewinding type of camera, in which all the photo film 11 is drawn out of the cassette shell 12 and wound about the take-up spool 21, and an exposure is taken on the photo film 11 each time the photo film 11 is rewound into the cassette shell 12 frame after frame.

The above embodiment utilizes the encoder including the encoder disk 30 and the photo sensor 31 to generate the encoded pulses according to rotation of the feeding motor 22. Alternatively it is possible to use a photo film encoder having an encoding disk contacted and rotated by a back surface of the photo film 11, for generating the encoded pulses proportionally to a moved distance of the photo film. It is also possible instead of the encoder to use a timer, in consideration of a proportional relationship between rotating time of the feeding motor 22 and the moving distance of the photo film 11. It is preferred to adjust a value measured by the timer according to the number of a frame in the one-frame feeding and the voltage of the power source, in consideration of the change in the proportional relationship due to the change in the diameter of the photo film roll about the take-up spool 21 and the power source voltage.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:
1. A photo film feeding control device for a camera, having a feeding motor by use of which photo film is fed, wherein said photo film has plural groups of perforations formed therein, and arranged along one edge thereof and regularly at a first distance one group from another, each of said perforation groups being associated with one frame, and including two of said perforations arranged at a second distance therebetween, said photo film feeding control device comprising:

a pulse generator for generating a pulse in synchronism with feeding of said photo film;

a sensor, disposed to confront with said photo film, for detecting said perforations in said photo film being fed;

a pulse counter for counting said pulse from said pulse generator while said photo film is fed by said first or second distance, said pulse counter starting counting said pulse upon movement of a first one of said perforations past said sensor, and finishing counting said pulse upon detection of a second one of said perforations at said sensor;

a comparator for comparing a counted number of said pulse counted by said pulse counter with a first reference value upon finish of counting said pulse, said comparator generating a first comparison signal if said counted number is equal to or more than said first reference value; and a controller for driving said feeding motor after an exposure is taken and for effecting a stopping control of said feeding motor being driven, wherein said stopping control decelerates said feeding motor if said first comparison signal occurs while said photo film is fed, and stops said feeding motor upon detection of a third one of said perforations at said sensor, and wherein if said pulse counter finishes counting said pulse without occurrence of said first comparison signal while said photo film is fed, said controller still drives said feeding motor without effecting said stopping control.

2. A photo film feeding control device as defined in claim 1, wherein said first reference value is determined as a number of pulses generated by said pulse generator while said photo film is fed by said first distance.

3. A photo film feeding control device as defined in claim 2, wherein said pulse generator includes:

an encoder disk, associated with a shaft of said feeding motor, rotated while said feeding motor rotates, said encoder disk having minute openings arranged radially and regularly; and a photo sensor, disposed near to said encoder disk, for detecting said minute openings, to cause generation of said pulse in response to detecting each of said minute openings.

4. A photo film feeding control device as defined in claim 2, wherein said photo film further includes an information recording region formed in an outside of said frame;

further comprising an information writer, disposed to confront with said photo film in stationary fashion, for writing information to said information recording region while said photo film is fed by said feeding motor;

wherein said controller controls said information writer in accordance with a signal from said sensor, drives said information writer in response to detecting that a portion of said photo film between said first and second perforations is moved to said sensor, and stops said information writer in response to detecting that said second perforation is moved to said sensor.

5. A photo film feeding control device as defined in claim 4, further comprising a frame counter for counting a number of times of feeding said photo film by said frame;

wherein said comparator compares said counted number with a second reference value smaller than said first reference value, said comparator generating a second comparison signal if said counted number is equal to or more than said second reference value; and said controller detects feeding of said photo film by said frame if said second comparison signal occurs while said photo film is fed, and steps said frame counter.

6. A photo film feeding control device as defined in claim 5, wherein said second reference value is determined as slightly greater than a number of pulses generated by said pulse generator while said photo film is fed by said second distance.

7. A photo film feeding control method for a camera, wherein photo film is fed by use of a feeding motor, said photo film has plural groups of perforations formed therein, and arranged along one edge thereof and regularly at a first distance one group from another, each of said perforation groups being associated with one frame, and including two of said perforations arranged at a second distance therebetween, said photo film feeding control method comprising steps of:

generating a pulse in synchronism with feeding of said photo film;

detecting through a sensor said perforations in said photo film being fed;

counting said pulse while said photo film is fed by said first or second distance, and during a period started upon movement of a first one of said perforations past said sensor and finished upon detection of a second one of said perforations at said sensor;

comparing a counted number of said pulse with a first reference value upon finish of counting said pulse;

if said counted number is equal to or more than said first reference value while said photo film is fed, decelerating said feeding motor;

after said feeding motor is decelerated, stopping said feeding motor upon detection of a third one of said perforations at said sensor; and if said counted number is less than said first reference value while said photo film is fed, still driving said feeding motor.

8. A photo film feeding control method as defined in claim 7, wherein said first reference value is determined as a number of pulses generated while said photo film is fed by said first distance.

9. A photo film feeding control method as defined in claim 8, wherein said camera includes:

an encoder disk, associated with a shaft of said feeding motor, rotated while said feeding motor rotates, said encoder disk having minute openings arranged radially and regularly; and a photo sensor, disposed near to said encoder disk, for detecting said minute openings, to cause generation of said pulse in response to detecting each of said minute openings.

10. A photo film feeding control method as defined in claim 8, wherein said photo film further includes an information recording region formed in an outside of said frame;

further comprising steps of:

starting writing information to said information recording region in response to a signal from said sensor detecting that a portion of said photo film between said first and second perforations is moved to said sensor, said information being written while said photo film is fed by said feeding motor; and stopping writing information to said information recording region in response to a signal from said sensor detecting that said second perforation is moved to said sensor.

11. A photo film feeding control method as defined in claim 10, further comprising steps of:

comparing said counted number with a second reference value smaller than said first reference value;

detecting feeding of said photo film by said frame if said counted number is equal to or more than said second reference value while said photo film is fed; and stepping a frame counter for counting a number of times of feeding said photo film by said frame.

12. A photo film feeding control method as defined in claim 11, wherein said second reference value is determined as slightly greater than a number of pulses generated while said photo film is fed by said second distance.

* * * * *